United States Patent [19]

Barnard

[11] 3,838,455

[45] Sept. 24, 1974

[54] HEAD CARRIAGE ASSEMBLY FOR MAGNETIC DISK STORAGE APPARATUS

[75] Inventor: Cecil Percy Barnard, Los Gatos, Calif.

[73] Assignee: International Business Machines Corporation, Armonk, N.Y.

[22] Filed: Mar. 5, 1973

[21] Appl. No.: 338,119

[52] U.S. Cl. .................................................. 360/78

[51] Int. Cl. .............................................. G11b 5/52

[58] Field of Search .................. 340/174.1 C; 308/6; 310/13, 12, 14, 16; 179/100.2 CA

[56] References Cited

UNITED STATES PATENTS

| | | | |
|---|---|---|---|
| 3,105,963 | 10/1963 | Stevens | 340/174.1 C |
| 3,185,972 | 5/1965 | Sippel | 340/174.1 C |
| 3,576,454 | 4/1971 | Beach, Jr. | 340/174.1 C |
| 3,587,075 | 6/1971 | Brown et al. | 340/174.1 C |
| 3,634,836 | 1/1972 | Hutten et al. | 340/174.1 C |
| 3,643,242 | 2/1972 | Bryer | 340/174.1 C |
| 3,646,536 | 2/1972 | Bleiman | 340/174.1 C |
| 3,666,977 | 5/1972 | Helms et al. | 340/174.1 C |
| 3,721,967 | 3/1973 | Englert et al. | 340/174.1 C |
| 3,735,163 | 5/1973 | Dijkstra | 310/13 |

*Primary Examiner*—Vincent P. Canney
*Attorney, Agent, or Firm*—Nathan N. Kallman

[57] ABSTRACT

A carriage assembly, useful in magnetic disk apparatus that employs movable accessing head assemblies, includes a channel-shaped body having paired angularly disposed bearings which ride on a cylindrical guide support rod. A high degree of stability is achieved by a sprung way that provides preload forces at one side of the carriage, and a fixed way at the other side of the carriage.

9 Claims, 4 Drawing Figures

HEAD CARRIAGE ASSEMBLY FOR MAGNETIC DISK STORAGE APPARATUS

CROSS REFERENCE TO RELATED APPLICATIONS

Copending patent application Ser. No. 206,688 filed Dec. 10, 1971 described a disk storage apparatus suited to utilize a carriage assembly, such as disclosed in the present application. A different carriage structure used in another type of disk storage apparatus is taught in U.S. Pat. No. 3,721,967, assigned to the same assignee as the present application.

BACKGROUND OF THE INVENTION

1. Field of the Invention

This invention relates to a novel and improved carriage assembly and, in particular, to a carriage for supporting and transporting access type magnetic head assemblies in a disk file.

2. Description of the Prior Art

The carriage assembly disclosed in this application is particularly useful in magnetic disk drives, and therefore will be described in relation thereto. In access type disk drive apparatus, a carriage assembly is used for transporting magnetic head assemblies bidirectionally to selected data tracks. The movement of the carriage and the head assemblies between the tracks is exceedingly rapid, in the order of milliseconds, for example,. A significant mass of carriage is moved when considering the small distances and tolerances, measured in microinches, that are involved. With such rapid short movements and a relatively large structure, it is necessary to achieve a high degree of stability with minimal vibration and resonance to ensure proper head-to-track alignment.

In order to improve access time, the mass of the carriage should be made as small as possible. Also, to improve mechanical stability, the mass of the carriage should be sufficiently stiff to preclude undue flexing and bending and vibrational effects; and any tendencies to roll, pitch or move off the axis of alignment which defines the desired bidirectional path of travel should be minimized.

SUMMARY OF THE INVENTION

An object of this invention is to provide a novel and improved carriage assembly that affords a high degree of stability.

Another object of this invention is to provide a carriage assembly that operates with minimal vibration and eliminates undesirable resonances.

According to this invention, a carriage assembly that is channel shaped has attached pairs of angled bearings that ride on a cylindrical rod or way. A fixed way and counteracting sprung way engage extensions from the carriage body to prevent roll of the carriage and to maintain stability.

BRIEF DESCRIPTION OF THE DRAWING

The invention will be described in greater detail with reference to the drawing, in which.

Similar reference numerals refer to similar elements throughout the drawing.

DESCRIPTION OF THE PREFERRED EMBODIMENT

Figure 1:
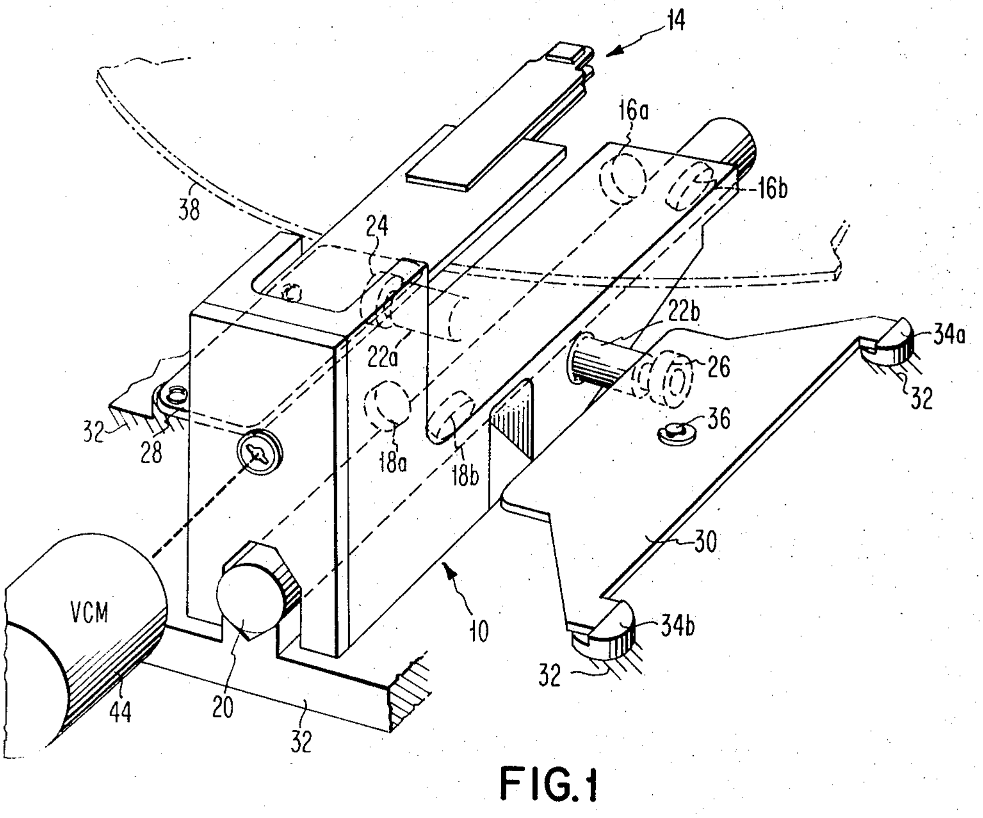
FIG. 1 is a perspective view of the carriage assembly, in accordance with this invention.
Figure 3:
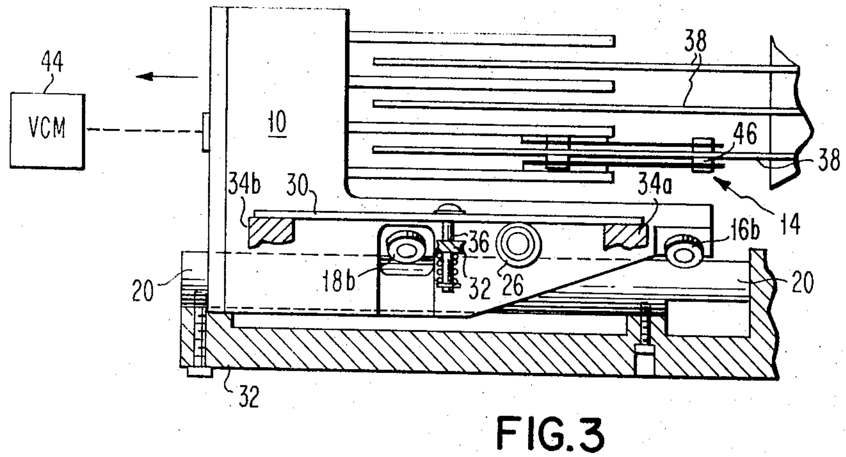
FIG. 3 is a side elevational view of the novel carriage assembly.
Figure 4:
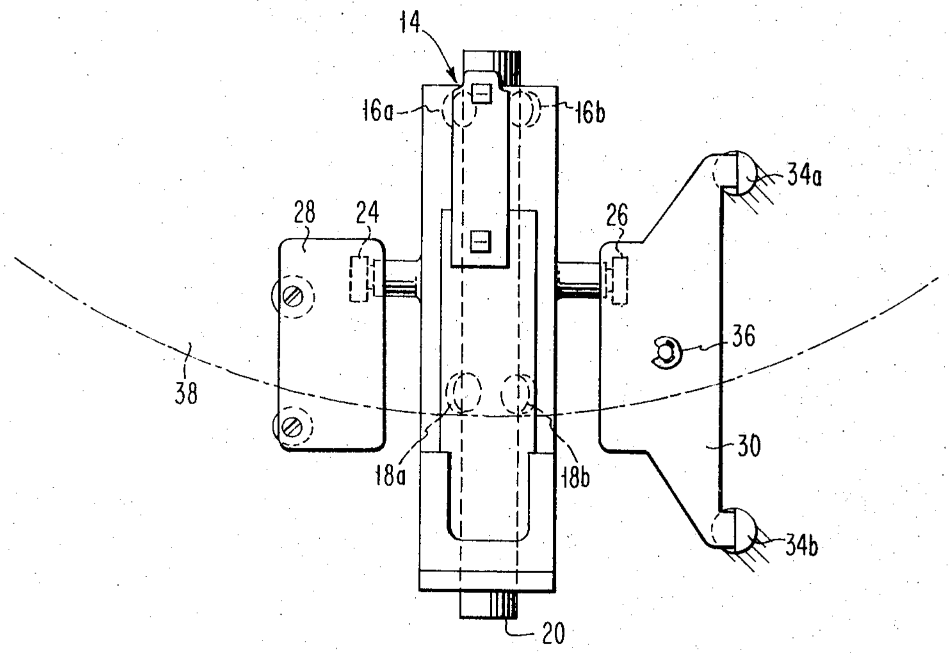
FIG. 4 is a top plan view of the carriage assembly disclosed herein.

With reference to the Figures of the drawing, a carriage assembly includes a channel or a U-shaped type body 10 which carries a receiver structure 12 for supporting a plurality of magnetic head assemblies 14. In a specific embodiment of the invention, the carriage body 10 has attached thereto a pair of front bearings 16, a,b and a pair of rear bearings 18 a,b that are disposed within the channel of the carriage, angularly with respect to the sides of the carriage body. The bearings ride on a cylindrical rod 20, which has a longitudinal axis that defines the path of bidirectional travel of the carriage. The bearings of each pair 16 and 18 are spaced circumferentially and substantially equidistantly from a vertical diameter of the rod 20.

Two ears 22 *a,b* that protrude from the sides of the carriage body support bearings 24 and 26, which respectively engage a fixed way 28 at one side and a sprung way 30 at the other side of the carriage. The fixed way 28 is attached to a stationary frame assembly 32 contained within a disk storage unit. The sprung way 30, which is made from a stiff sheet steel plate approximately .094 inch in thickness, for example, has a trapezoidal shape. The longest side of the trapezoidal way 30 is seated on two spaced bosses 34 *a,b* formed with the frame casting 32. The bearing 26 moves adjacent to the shorter of the parallel sides of the trapezoidal way 30.

Figure 2:
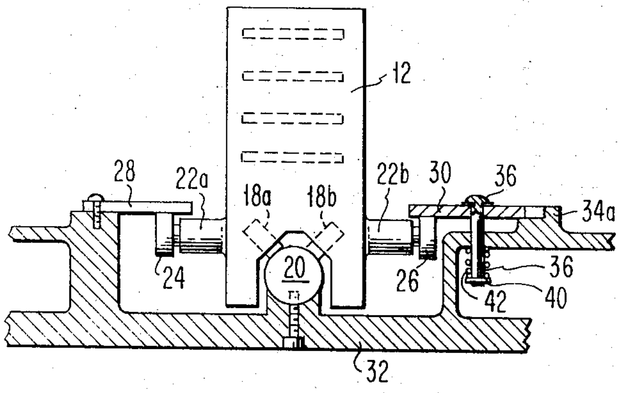
FIG. 2 is a rear view of the carriage assembly of this invention.

As illustrated in FIG. 2, the sprung way 30 has a central aperture through which a bolt 36 is positioned and fastened. The bolt extends through a close fitting aperture in the frame 32, and has a stop washer 40 fastened to its other end. Between the washer 40 and frame 32, a resilient element or spring 42 is disposed. The spring 42 is compressed and tensed so as to provide a preload force downwards from the sprung way or plate 30 towards the frame 32 and washer 40. Thus a load force is exerted by the way 30 against the bearing 26, which is positioend at the upper side of the plate 30. To counteract and balance this load force, which would tend to roll the carriage assembly about the rod 20, the fixed way 28 which has a predetermined thickness or height, is located on the casting 32 at a predetermined horizontal level related to the plane of the sprung way 30, so that no roll of the carriage will occur.

The angularly disposed pairs of bearings 16 and 18 are positioned and spaced so as to provide easy rapid travel of the carriage with optimum stability. For example, the angular tilt relative to the vertical is about 45° for each bearing, and the bearings of each pair are spaced about 90° around the circumference of the rod 20. This angular relationship of the bearings on the round section insures a seating of the four bearings that provides stability of carriage and receiver assembly relative to the rod. Each end of the rod or way 20 is mounted to the frame casting 32, such that the carriage and head assemblies maintain a fixed relationship to the disk surfaces 38.

To accomplish the track accessing function, an actuator such as a voice coil motor 44 is coupled to the head carriage 10 and receiver structure 12, when operating the disk unit or module in a file housing. The center of gravity of the carriage and actuator assembly is established as close as possible to the axis center of the voice coil motor 44, and the voice coil should be placed as close as possible to the head carriage 10.

In a particular application of the head carriage assembly of this invention, the carriage and receiver assembly supports a track following servo head 46 ganged to a plurality of data read/write heads 14. Each head cooperates in transducing relation with an associated magnetic disk surface 38 and the radial movement of the comb-like ganged head assembly is controlled by the voice coil motor 44, subject to a fine radial adjustment control by the servo head.

For optimum servo performance, which is highly desirable in high density systems where data tracks are closely spaced, as well as the data bits along the tracks, it is necessary to achieve a stiffness-to-weight ratio of the head carriage assembly as high as possible, thereby attaining a sufficiently high fundamental resonant frequency to enhance servo performance. Stiffness of the main section of the carriage is achieved by using the channel-type cross section made of a rigid material, such as aluminum of sufficient thickness.

Also, in servo controlled devices, it is a design objective to position the center of mass, the center of friction, and the point of application of the driving force at the same point in space. This objective is achieved by concentrating the mass of the carriage around an axis that is parallel to and coincident with, or closely adjacent to, the axis of frictional resistance and the axis of the drive force input, namely, the voice coil motor. The natural symmetry obtained, by placing the mass around a central axis and by positioning the two pairs of bearings in a balanced geometry, serves to improve the dynamic performance of the head carriage drive system.

The use of the single rod structure 20, in lieu of a base-plate and a plurality of guide rails as previously used in the prior art, reduces the weight and the cost of carriage assembly. Also, the precision tolerances are much less than that required for the baseplate and spaced guide rail configuration. The balanced symmetrical design of the carriage assembly disclosed in this application precludes the introduction of spurious vibrations or undesirable instability during rapid intermittent bidirectional radial travel of the carriage and magnetic heads.

What is claimed is:

1. A carriage assembly useful with bidirectional accessing transducers in storage apparatus comprisng:

a frame assembly;

a single cylindrical rod in fixed position on said frame assembly, the axis of said rod defining a desired direction of travel;

a carriage structure seated to said rod for transporting said accessing transducers;

a fixed way attached to said frame assembly positioned adjacent to one side of said carriage structure;

a sprung way attached to said frame assembly positioned adjacent to the other side of said carriage structure; and a plurality of bearings attached to said carriage structure for engaging said ways and said rod, so that the tendency for said carriage structure to roll about said rod is limited, said bearings being substantially in the same plane.

2. A carriage assembly as in claim 1, wherein said carriage structure includes a channel-shaped portion that partially surrounds said rod.

3. A carriage assembly as in claim 1, wherein said plurality of bearings comprises two pairs of bearings, the bearing pairs being spaced along said rod axis to provide pitch stability; and the bearings of each pair being spaced approximately 90° around the circumference of said rod.

4. A carriage assembly as in claim 1, wherein said carriage structure includes a receiver for mounting a multiplicity of magnetic transducers.

5. A carriage assembly as in claim 4, wherein said multiplicity of magnetic transducers includes at least one servo transducer.

6. A carriage assembly as in claim 1, further including an actuator for driving said assembly bidirectionally.

7. A carriage assembly as in claim 1, wherein said sprung way comprises a trapezoidal apertured plate.

8. A carriage assembly as in claim 7, including a bolt disposed through the aperture of said plate and connected to said frame assembly; and a resilient element encompassing a portion of said bolt and compressed against said frame assembly.

9. A carriage assembly as in claim 1, wherein said fixed way and sprung way are located in the same horizontal plane.

* * * * *